United States Patent [19]
Brulard

[11] 3,828,233
[45] Aug. 6, 1974

[54] SWITCHING ENABLING TWO ELECTRICAL MACHINES TO MOTOR OR REGENERATE WITH THEIR ARMATURES IN PARALLEL OR IN SERIES

[75] Inventor: Michel Brulard, Clamart, France
[73] Assignee: Jeumont Schneider, Puteaux, France
[22] Filed: July 27, 1973
[21] Appl. No.: 383,402

[30] Foreign Application Priority Data
July 31, 1972   France .............................. 72.27495

[52] U.S. Cl. .................................. 318/87, 318/376
[51] Int. Cl. ............................................ H02p 3/00
[58] Field of Search ........... 318/55, 57, 87, 95, 111, 318/139, 247, 375, 376, 377

[56] References Cited
UNITED STATES PATENTS
| | | | |
|---|---|---|---|
| 3,059,160 | 10/1962 | Posselt | 318/87 X |
| 3,601,670 | 8/1971 | Eriksson et al. | 318/87 |
| 3,743,901 | 7/1973 | Johnson | 318/87 |

Primary Examiner—Robert K. Schaefer
Assistant Examiner—W. E. Duncanson, Jr.

[57] ABSTRACT

System enabling two d.c. machines to change over rapidly from operation as series wound motors to operation as independently excited generators regenerating to a main power supply. The system mainly comprises a four-pole changeover and disconnecting switch which connects inductors in series either with their respective armature or with an auxiliary power supply, and four diodes shunted by four contactors. Of use in electric driving vehicles and locomotives for regenerative braking to the main power supply.

5 Claims, 1 Drawing Figure

PATENTED AUG 6 1974 3,828,233
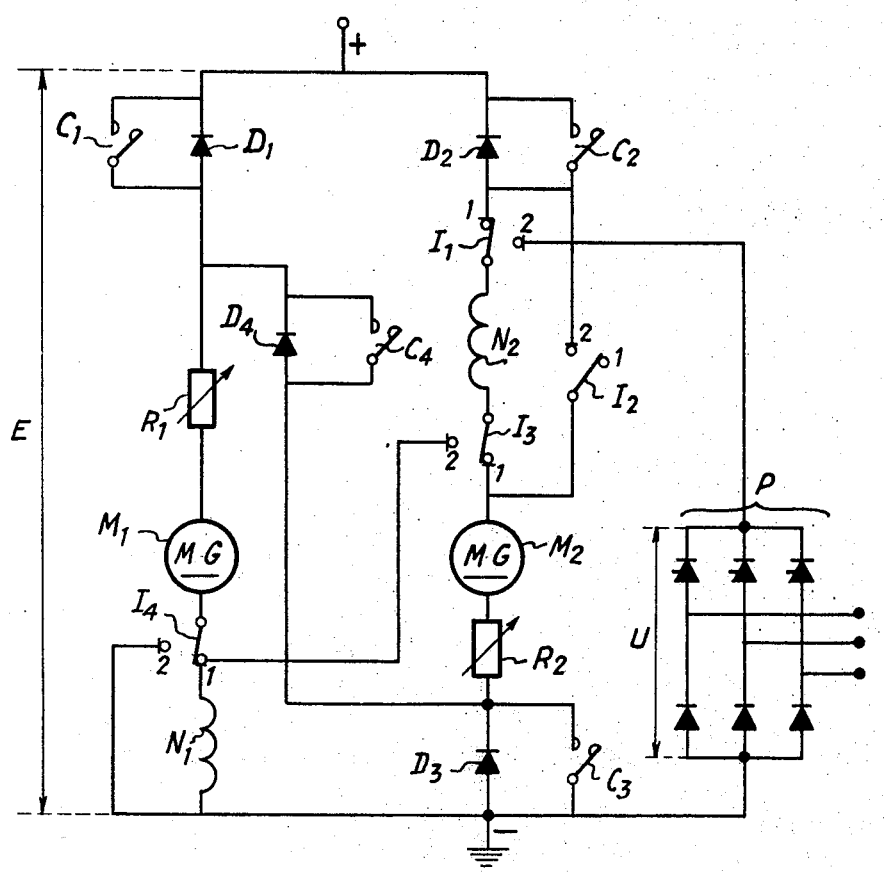

SWITCHING ENABLING TWO ELECTRICAL MACHINES TO MOTOR OR REGENERATE WITH THEIR ARMATURES IN PARALLEL OR IN SERIES

A distinctive feature of some forms of electric train operation such as metropolitan and suburban trains is very frequent stopping and starting due to the short distance between the many stations served. Regenerative train braking, enabling the traction motors to return most of their kinetic energy to the main supply, would therefore seem desirable; however, it is not at present very common and trains of the kind specified are usually decelerated by means of mechanical friction brakes, with or without rheostatic braking in which the traction motors regenerate into rheostats. Consequently, all the kinetic energy of the trains is converted into heat, leading to problems of heat removal in the case of underground trains. Of course, power wastage and heat removal problems increase as train headways, maximum speeds and numbers of passengers carried increase.

What has so far hindered the development of regenerative braking despite its advantages is that all the traction equipment so far available has been of the heavy and bulky electromechanical kind which cannot give a satisfactory rapid performance of the relatively complex operations needed to change the motors over from motoring to generating at a substantially constant voltage, more particularly in the case of systems comprising a number of series-wound motors which can be connected together either in series or in parallel.

This invention relates to a switching facility in which diodes are associated with electromechanical devices in order to simplify switching operations between machines and between their armature and field windings so that the operations can be performed rapidly.

The invention relates to changeover switching for the operation of two electrical machines as series-wound motors or as independently excited generators regenerating to the supply, with in both cases the possibility of parallel or series operation of the machines, characterized in that it comprises:

A four-pole changeover and disconnecting switch enabling the machine field windings to be connected either in series with their respective armature or to an auxiliary d.c. supply;

A first diode whose cathode is connected to the positive pole of the supply and whose anode is connected to the armature of the first machine;

A second diode whose cathode is connected to the positive pole of the supply and whose anode is connected to two of the contacts of the changeover and disconnecting switch, the anode being connected, depending upon switch position, either to one side of the armature of the second machine or to the field winding thereof;

A third diode whose cathode is connected to the other side of the armature of the second machine and whose anode is connected to the negative pole of the supply;

A fourth diode whose cathode and anode are connected to the first-diode anode and to the third-diode cathode respectively;

Four contactors connected in parallel with the four diodes for parallel or series operations of the machines on motoring or generating, and Two rheostats for limiting and stabilizing the armature currents of the machine on both motoring and generating.

Operation of the facility according to the invention will be better understood if reference is made to an embodiment, for which the circuit diagram is shown in the single FIGURE forming the accompanying drawing wherein the two machines are represented by their field windings $N_1$, $N_2$ and their armatures $M_1$, $M_2$.

Connected to a power supply E represented by its + and − terminals are:

Four diodes $D_1$, $D_2$, $D_3$, $D_4$;

Four contactors $C_1$, $C_2$, $C_3$, $C_4$ shunting the diodes $D_1$, $D_2$, $D_3$, $D_4$;

A four-pole changeover and disconnecting switch whose moving contacts are in the 1 positions; for motoring and in the 2 positions for generating;

Two rheostats R1 and R2, and

An auxiliary d.c. supply represented by a rectifier bridge P energized by a three-phase supply and adapted to provide an adjustable d.c. voltage U.

If the position of the switch and contactors and the value of the rheostats is controlled by an appropriate logic, the system can provide the four following kinds of operation:

a. Motoring with the two machines in series, for low-speed traction operation, the switch being in the 1 position the two contactors $C_2$ and $C_4$ being closed, the two contactors $C_1$ and $C_3$ open, and the rheostats R1 and R2 adjusted to give the required torque and therefore the required speed;

b. Motoring with the two machines connected in parallel, corresponding to high-speed traction operations with the switch in its 1 position, the three contactors $C_1$ $C_2$ $C_3$ closed, the contactor $C_4$ open and the rheostats R1, R2 adjusted to give the required torque.

Changing over from operation a) to b) is therefore just a matter of opening contactor $C_4$ and closing contactors $C_2$, $C_3$.

c. Regeneration with the two machines connected in parallel, for high-speed braking operation, the switch being in its 2 position (so that the two fields N1 and N2, in series with one another, of the two machines are energized with the adjustable voltage output by the bridge P), the contactors $C_1$ $C_2$ $C_3$ $C_4$ being open, the rheostats R1 and R2 set to a fixed value and the bridge voltage U adjusted to give the required braking torque.

d. Regeneration with the two machines connected in series, for low-speed braking operation, the switch still being in its 2 position, the contacts $C_1$ $C_2$ $C_3$ being open, the contact $C_4$ closed, the rheostats R1 and R2 being at a fixed value and the bridge voltage U being adjusted to give the required braking torque.

Changing over from operation c) to operation d) is therefore just a matter of closing the contactor $C_4$ (the diode $D_1$ turning off automatically because of the voltage applied to its anode).

In practical use, at starting the two motors are connected in series (operation a)), the rheostats R1 and R2 being at maximum resistance to limit the starting current. The rheostats R1, R2 are then gradually reduced in proportion as the motors speed up. After the resistance have been cut out, for a further speed increase the motors are changed over from series to parallel connection (operation $b$)), the rheostats R1, R2 being simultaneously adjusted to a value which prevents an abrupt variation of the driving torque, whereafter the resistance R1 and R2 are gradually reduced again.

To change over to braking:

Motor current is interrruted by opening any of the contactors $C_1$, $C_2$, $C_3$, $C_4$ which happen to be closed, and The switch is moved from its 1 position to its 2 position so that the fields $N_1$ and $N_2$ are energized at the bridge voltage U which is deliberately chosen low to start with.

If speed is high the electromotive force appearing across the armatures $M_1$ and $M_2$ is higher than the voltage across the main supply, and so the generators are connected in parallel (operation $c$)) and the voltage output by the bridge P is adjusted to give the required braking torque. For this purpose to be maintained, generator excitation must be gradually increased as speed drops. When generator excitation has reached the maximum compatible with the properties of the equipment, the generators must be switched to series connection (operation $d$)); simultaneously, generator excitation must be reduced to prevent any abrupt variation of the braking torque. Generator excitation is then gradually increased again as speed drops.

If speed is too low at the start of braking for the voltage output by each generator to be above the main supply voltage, series connection of the generators is resorted to straight away (operation $d$)).

The presence of the diodes in the circuit prevents any braking current reversal should for any reason the main supply voltage rise to above the voltage across the system.

The system hereinbefore described by way of example is of use more particularly for electric driving vehicles and locomotives.

I claim:

1. Changeover switching for the operation of two electrical machines as series-wound motors or as independently excited generators regenerating to the supply, with in both cases the possibility of parallel or series operation of the machines, characterized in that it comprises:

A four-pole changeover and disconnecting switch enabling the machine field windings to be connected either in series with their respective armature or to an auxiliary d.c. supply;

A first diode whose cathode is connected to the positive pole of the supply and whose anode is connected to the armature of the first machine;

A second diode whose cathode is connected to the positive pole of the supply and whose anode is connected to two of the contacts of the changeover and disconnecting switch, the anode being connected, depending upon switch position, either to one side of the armature of the second machine or to the field winding thereof;

A third diode whose cathode is connected to the other side of the armature of the second machine and whose anode is connected to the negative pole of the supply;

A fourth diode whose cathode and anode are connected to the first-diode anode and to the third diode cathode respectively;

Four contactors connected in parallel with the four diodes for parallel or series operations of the machines on motoring or generating, and Two rheostats for limiting and stabilizing the armature currents of the machines.

2. A changeover switching as claimed in claim 1, further characterized in that the two machines are connected in series to motor, by the changeover and disconnecting switch being placed in the position connecting each field in series with the armature of the corresponding machine and by closure of the contactors in parallel on the second and fourth diodes.

3. A changeover as claimed in claim 1, further characterized in that the two machines are connected in parallel to motor, by the changeover and disconnecting switch being placed in the position connecting each field in series with the armature of the corresponding machine and by closure of the contactors shunted across the first, second and third diodes.

4. A changeover as claimed in claim 1, further characterized in that the two machines connected in parallel to generated, by the changeover and disconnecting switch being placed in the position energizing the fields from an auxiliary d.c. supply and by keeping all the contactors open.

5. A changeover as claimed in claim 1, further characterized in that the two hmachines connected in series to generate, by the changeover and disconnecting switch being placed in the position energized the fields from an auxiliary d.c. supply and by closure of the contactor shunted across the fourth diode.

* * * * *

UNITED STATES PATENT OFFICE
CERTIFICATE OF CORRECTION

Patent No. 3,828,233      Dated August 6, 1974

Inventor(s) MICHEL BRULARD

It is certified that error appears in the above-identified patent and that said Letters Patent are hereby corrected as shown below:

IN THE ABSTRACT:

Line 6, "inductors" should read -- field windings--.

IN THE SPECIFICATION:

Column 4, line 39, "to generated" should read -- to generate --;

line 44, " hmachines" should read -- machines --;

line 46, "energized" should read -- energizing --.

Signed and Sealed this twenty-sixth Day of August 1975

[SEAL]

Attest:

RUTH C. MASON
*Attesting Officer*

C. MARSHALL DANN
*Commissioner of Patents and Trademarks*